US007019622B2

(12) United States Patent
Orr et al.

(10) Patent No.: US 7,019,622 B2
(45) Date of Patent: Mar. 28, 2006

(54) HANDHELD ELECTRONIC DEVICE INCLUDING VIBRATOR HAVING DIFFERENT VIBRATION INTENSITIES AND METHOD FOR VIBRATING A HANDHELD ELECTRONIC DEVICE

(75) Inventors: Kevin H. Orr, Elmira (CA); George S. Mankaruse, Kitchener (CA); Ali Asaria, Richmond Hill (CA)

(73) Assignee: Research In Motion Limited, Ontario (CA)

( * ) Notice: Subject to any disclaimer, the term of this patent is extended or adjusted under 35 U.S.C. 154(b) by 147 days.

(21) Appl. No.: 10/855,587

(22) Filed: May 27, 2004

(65) Prior Publication Data

US 2005/0275508 A1 Dec. 15, 2005

(51) Int. Cl.
*H04B 3/36* (2006.01)

(52) U.S. Cl. .................. 340/407.1; 340/540; 455/348; 455/567; 455/575.2

(58) Field of Classification Search ................ 455/147, 455/347, 348, 575.2, 403, 404.1, 91, 92, 455/567; 340/407.1, 540, 562, 551, 568.1, 340/539.23, 539.32, 686.1, 687
See application file for complete search history.

(56) References Cited

U.S. PATENT DOCUMENTS 5,896,096 A * 4/1999 Kim .......................... 340/7.24
6,452,588 B1 9/2002 Griffin et al.
6,489,950 B1 12/2002 Griffin et al.
6,643,528 B1 * 11/2003 Shim et al. .............. 455/575.2
6,674,358 B1 * 1/2004 Tinsley ...................... 340/7.63
6,774,769 B1 * 8/2004 Okada ..................... 340/407.1
6,836,212 B1 * 12/2004 Sawinski ............... 340/539.23
2004/0067780 A1 4/2004 Eiden

FOREIGN PATENT DOCUMENTS

DE 297 07 166 U 8/1997
GB 2 378 616 A 2/2003
GB 2 378 617 A 2/2003
WO WO 91/06932 A1 5/1991
WO WO 02/054363 A1 7/2002

OTHER PUBLICATIONS

Winbond Electronics Corp., W53322/W53342, “60” Voice/Melody/LCD Controller (View Talk™ Series), Mar. 1999, pp. 1-8.

(Continued)

*Primary Examiner*—Davetta W. Goins
(74) *Attorney, Agent, or Firm*—Kirk D. Houser; Brij K. Agarwal; Eckert Seamans Cherin & Mellott, LLC

(57) ABSTRACT

A handheld electronic device includes a housing adapted to engage a holster, and a sensor having an input adapted to sense engagement of the housing with the holster and an output responsive to that engagement. The output includes an out-of-holster state and an in-holster state. A processor circuit includes a routine, an input receiving the sensor output and an output having a first intensity state and a second greater intensity state. A vibrator within the housing is adapted to vibrate the housing at a plurality of different intensities. The routine outputs to a control circuit the first intensity state when the sensed engagement includes the out-of-holster state, and the second greater intensity state when the sensed engagement includes the in-holster state. The control circuit activates the vibrator at a first intensity corresponding to the first intensity state and at a second greater intensity corresponding to the second greater intensity state.

41 Claims, 8 Drawing Sheets

OTHER PUBLICATIONS

Winbond Electronics Corp., W523AXXX, "High Fidelity PowerSpeech™", May 20, 2003, pp. 1-19.

Winbond Electronics Corp., W588SXXX Data Sheet, "8-Bit MCU With Voice/Melody Synthesizer (PowerSpeech™ Series)", Nov. 19, 2003, pp. 1-9.

OKI Electric Industry Co. Ltd., "ML2870A Data Sheet [Digest Version]", Aug. 29, 2003, pp. 1-4.

LG Electronics Service, "VX3100 Cellular Phone", Apr. 26, 2003, pp. 1-125.

SONIX, SNC384, "Direct Drive Speech/Melody Controller", Oct. 18, 2001, pp. 1-7.

FreeCellPhoneDeals, "Nokia 3588 Free Cell Phone Sprint PCS Free Cell Phones", http://free-cell-phone-deals.com/pages/Sprint-Nokia-3588i.htm, Mar. 12, 2004, pp. 1-3.

OKI Silicon Solutions Company, "Oki, Network Solutions for a Global Society", http://www.okisemi.com/jp/English/ml2870.htm, Apr. 27, 2004, pp. 1-3.

Nippon Precision Circuits Inc., "SM1350 series High Tone Quality Melody LSI", Oct. 1998, pp. 1-21.

Nippon Precision Circuits Inc., "SM1124 Series Multimelody IC for Pagers", Jan. 1996, pp. 1-10.

OKI Electric Industry Co. Ltd., "ML2870 Data Sheet, Version 1.0.1", Jan. 29, 2003, pp. 1-92.

* cited by examiner

FIG.4
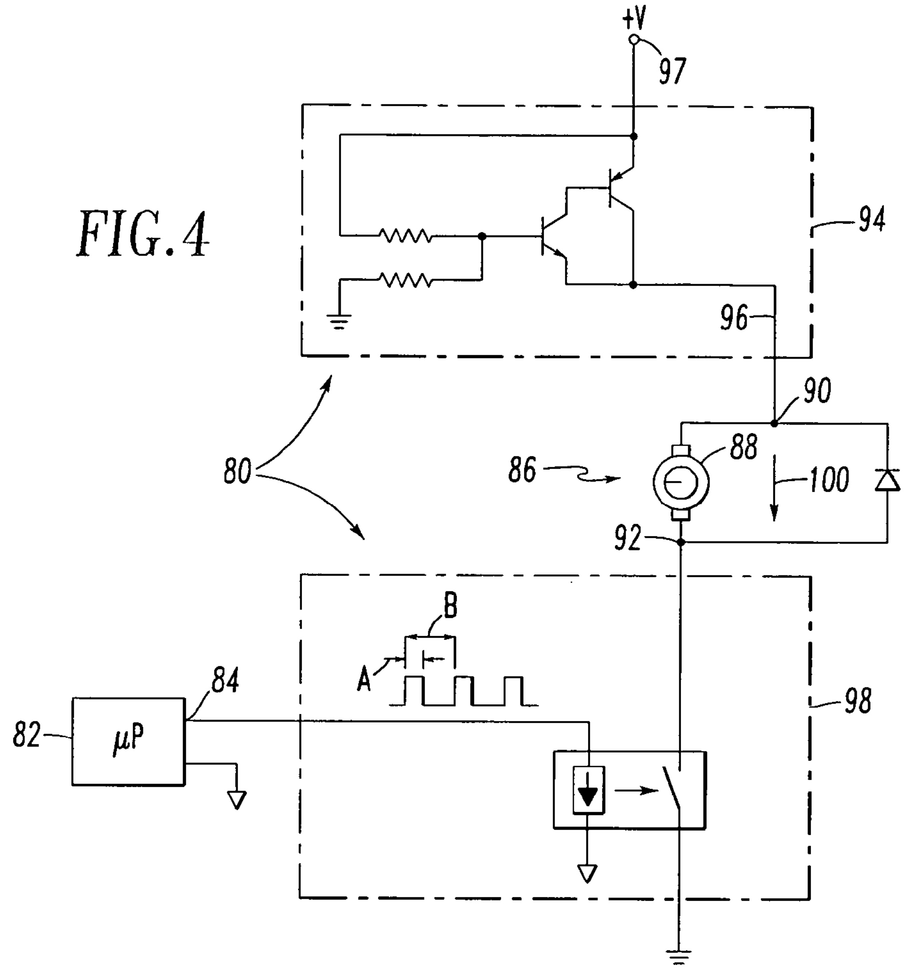
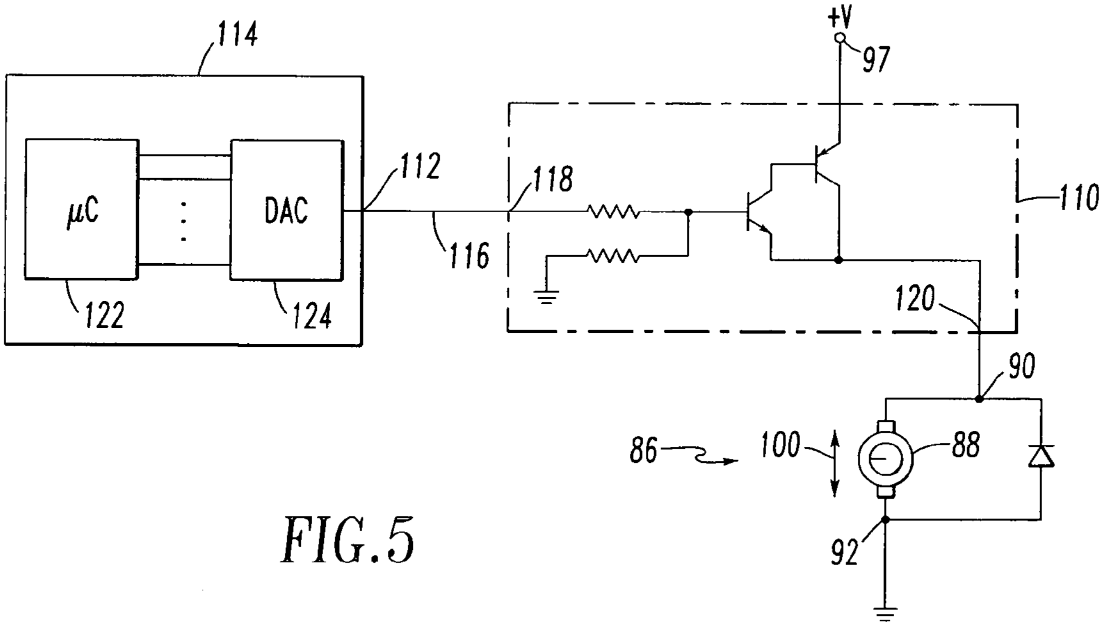
FIG.5

170

HANDHELD ELECTRONIC DEVICE INCLUDING VIBRATOR HAVING DIFFERENT VIBRATION INTENSITIES AND METHOD FOR VIBRATING A HANDHELD ELECTRONIC DEVICE

BACKGROUND OF THE INVENTION

1. Field of the Invention

This invention pertains generally to handheld electronic devices and, more particularly, to handheld electronic devices including a vibrator. The invention also relates to a method for vibrating a handheld electronic device.

2. Background Information

In known handheld electronic devices employing a vibrator, it is believed that there is only a single fixed, non-zero setting for the level of the vibrator motor revolutions per minute (RPM). This RPM level is typically set to correspond to a relatively very high vibration intensity level.

There are known cellular telephone devices, which implement personalized ring tones, based on installable ring tones, in combination with vibration. See, for example, http://free-cell-phone-deals.com/pages/Sprint-Nokia-3588i.htm; and http://www.northcoastpcs.com/PDF/Manuals/VX3100.pdf. It is believed that such known cellular telephone devices provide custom vibration techniques through ring tones (e.g., with a melody integrated circuit (IC)) and by turning vibration on and off, while employing a constant on/off vibrator duty cycle and a constant vibration intensity. One known cellular telephone device provides several vibrator settings along with tones in which "the number of vibrations" is varied. It is believed that such known cellular telephone device sequences the on and off pattern of the vibrator and employs a constant vibration intensity. It is believed that handheld controls for computer games including a vibrator employ a constant vibration intensity. It is known to provide a melody IC including a VIB register that could adjust the intensity of a directly driven vibrator in 128 steps.

It is known to provide an on and off option to enable or disable, respectively, a vibrator for the "out-of-holster" state of a handheld electronic device. Alternatively, for minimal user distraction, it is known to employ a light emitting diode for notification of an event in such "out-of-holster" state.

Accordingly, there is room for improvement in handheld electronic devices including a vibrator, and in methods for vibrating a handheld electronic device.

SUMMARY OF THE INVENTION

These needs and others are met by the invention, which provides one or both of attenuated and varied vibration intensity response in a handheld electronic device including a plurality of different operating states and a plurality of corresponding vibration intensities.

As one aspect of the invention, a handheld electronic device comprises: a housing; a processor circuit including a plurality of different operating states and an output having a plurality of different states corresponding to at least some of the different operating states; a vibrator within the housing, the vibrator adapted to vibrate the housing at a plurality of different intensities; a control circuit adapted to activate the vibrator at the different intensities responsive to the different states of the output of the processor circuit and corresponding to the at least some of the different operating states; and a power source adapted to power at least one of the processor circuit, the vibrator and the control circuit.

The different operating states may include at least two of the group comprising in-holster, out-of-holster, in-use, non-use and stored, and non-use and not stored. The processor circuit may further include a plurality of different notification events of the handheld electronic device. A routine may be adapted to determine a current one of the different operating states and to output the different states corresponding to a current one of the different notification events and the determined current one of the different operating states.

The control circuit may include a light sensor adapted to sense a plurality of different light intensity levels. The processor circuit may further include a routine adapted to determine if the handheld electronic device is in-use. The routine, responsive to the sensed different light intensity levels and whether the handheld electronic device is in-use, may output a corresponding one of the different states of the output thereof. The control circuit may activate the vibrator at one of the different intensities corresponding to the corresponding one of the different states.

As another aspect of the invention, a handheld electronic device comprises: a housing adapted to engage a holster; a sensor including an input adapted to sense engagement of the housing with the holster and an output responsive to the sensed engagement, the output responsive to the sensed engagement including one of an out-of-holster state and an in-holster state; a processor circuit including a routine, an input receiving the output of the sensor, and an output having a plurality of different states including a first intensity state and a second different intensity state; an input circuit cooperating with the processor circuit; an output circuit cooperating with the processor circuit; a vibrator within the housing, the vibrator adapted to vibrate the housing at a plurality of different intensities; a control circuit adapted to activate the vibrator at the different intensities responsive to the different states of the output of the processor circuit; and a power source adapted to power at least one of the processor circuit, the vibrator and the control circuit, wherein the routine of the processor circuit is adapted to output to the control circuit the first intensity state when the sensed engagement includes the out-of-holster state, and the second different intensity state when the sensed engagement includes the in-holster state, and wherein the control circuit activates the vibrator at one of a first intensity corresponding to the first intensity state and at a second different intensity corresponding to the second different intensity state.

The handheld electronic device may include a plurality of different operating states including at least three of the group comprising the out-of-holster state, the in-holster state, in-use, non-use and stored, and non-use and not stored. The processor circuit may further include a plurality of different notification events of the handheld electronic device. The routine of the processor circuit may further be adapted to determine a current one of the different operating states and to output one of the different states corresponding to a current one of the different notification events and the determined current one of the different operating states.

The processor circuit may further be adapted to determine if the handheld electronic device is in-use. The different states of the output of the processor circuit may further include a third different intensity state. The routine of the processor circuit may further be adapted to output to the control circuit the third different intensity state when the sensed engagement includes the out-of-holster state and when the processor circuit determines that the handheld electronic device is in-use. The control circuit may activate the vibrator at a third different intensity corresponding to the third different intensity state.

The routine may be a first routine, and the processor circuit may further include a second routine. The first routine may determine if the handheld electronic device is in-use based upon the second routine being activated.

As another aspect of the invention, a method for vibrating a handheld electronic device comprises: employing a plurality of different notification events of the handheld electronic device; employing a plurality of different operating states of the handheld electronic device; employing a plurality of different vibration intensity levels; and configuring the handheld electronic device to selectively vibrate at the different vibration intensity levels as a function of a current one of the different notification events and a current one of the different operating states.

The method may further comprise automatically determining the current one of the different operating states; and automatically vibrating the handheld electronic device at a corresponding one of the different vibration intensity levels based upon the current one of the different notification events and the determined current one of the different operating states.

The method may further comprise selecting the different operating states of the handheld electronic device from the group comprising in-holster, out-of-holster, and out-of-holster and in-use.

The method may further comprise employing as some of the different operating states a plurality of different operating modes of the handheld electronic device; automatically determining a current one of the different operating modes; and automatically vibrating the handheld electronic device at a corresponding one of the different vibration intensity levels based upon the current one of the different notification events and the determined current one of the different operating modes.

The method may further comprise initially vibrating the handheld electronic device at one of the different vibration intensity levels; and changing the one of the different vibration intensity levels.

The method may further comprise continuously changing the one of the different vibration intensity levels over time.

BRIEF DESCRIPTION OF THE DRAWINGS

A full understanding of the invention can be gained from the following description of the preferred embodiments when read in conjunction with the accompanying drawings in which:

FIG. 4 is a block diagram in schematic form of a handheld electronic device vibrator drive control circuit in accordance with an embodiment of the invention.

FIG. 5 is a block diagram in schematic form of another handheld electronic device vibrator drive control circuit in accordance with another embodiment of the invention.

DESCRIPTION OF THE PREFERRED EMBODIMENTS

As employed herein, the term “holster” shall expressly include, but not be limited by, any object employed to temporarily hold, carry, use and/or store therein or therewith a handheld electronic device.

As employed herein, the term “melody circuit” shall expressly include, but not be limited by, any circuit, such as, for example, an integrated circuit or melody generator, adapted to generate and/or output one or more signals representing a plurality of different electrical and/or audible tones or melodies.

Figure 1:
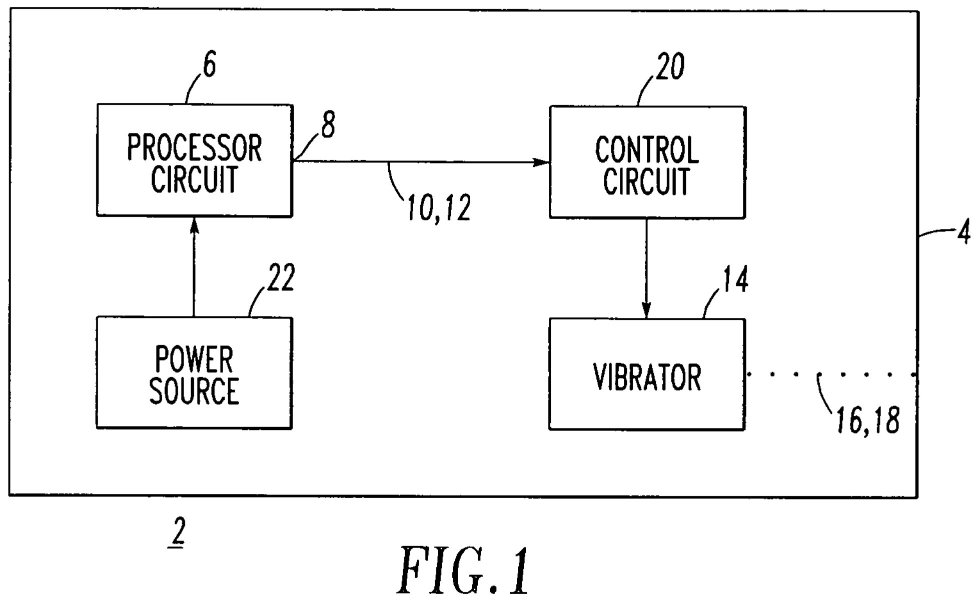
FIG. 1 is a block diagram of a handheld electronic device in accordance with the invention.

Referring to FIG. 1, a handheld electronic device 2 is shown. The device 2 includes a housing 4 and a suitable processor circuit 6 having an output 8 with a plurality of different states 10,12. A vibrator 14 is disposed within the housing 4. The vibrator 14 is adapted to vibrate the housing 4 at a plurality of different intensities 16,18. A control circuit 20 is adapted to activate the vibrator 14 at the different intensities 16,18 responsive to the respective different states 10,12 of the processor circuit output 8. A suitable power source 22 (e.g., a battery) is adapted to power one or more of the processor circuit 6, the vibrator 14 and the control circuit 20.

Non-limiting examples of a handheld electronic device are disclosed in U.S. Pat. Nos. 6,452,588; and 6,489,950, which are incorporated by reference herein.

EXAMPLE 1

The processor circuit 6 may include a plurality of different operating modes (e.g., device in-use; device idle; device navigation in progress). The different states 10,12 of the processor circuit output 8 may correspond to some or all of those different operating modes. The control circuit 20 may activate the vibrator 14 at the different intensities 16,18 corresponding to such some or all of the different operating modes.

Figure 2:
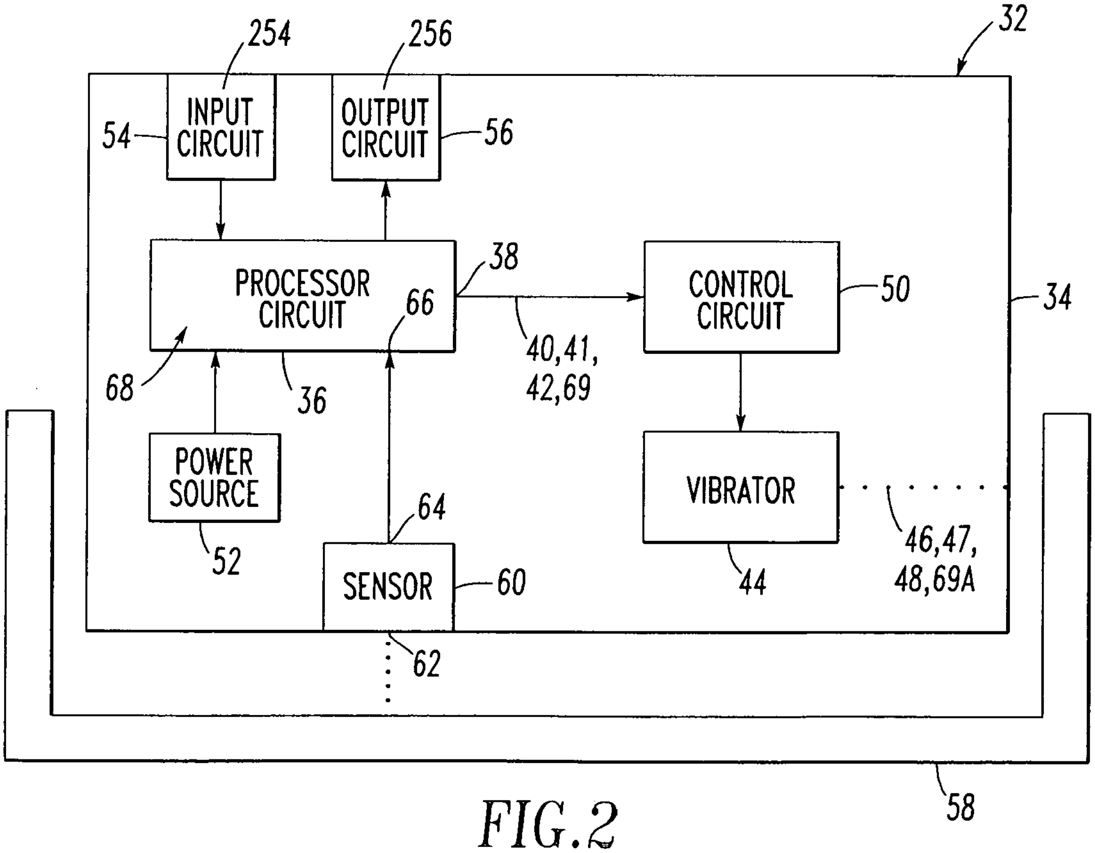
FIGS. 2 and 3 are block diagrams of handheld electronic devices in accordance with other embodiments of the invention.

FIG. 2 shows another handheld electronic device 32. The device 32 includes a housing 34 and a suitable processor circuit 36 having an output 38 with a plurality of different states 40,41,42. A vibrator 44 is disposed within the housing 34. The vibrator 44 is adapted to vibrate the housing 34 at a plurality of different intensities 46,47,48. A control circuit 50 is adapted to activate the vibrator 44 at the different intensities 46,47,48 responsive to the respective different states 40,41,42 of the processor circuit output 38. A suitable power source 52 is adapted to power one or more of the processor circuit 36, the vibrator 44 and the control circuit 50. A suitable input circuit 54 (e.g., a user input device; a keyboard) and a suitable output circuit 56 (e.g., a user output device; a display) cooperate with the processor circuit 36.

The housing 34 is adapted to optionally engage a holster 58. A sensor 60 includes an input 62 adapted to sense engagement of the housing 34 with the holster 58 and an output 64 responsive to such sensed engagement. The processor circuit 36 includes an input 66 receiving the sensor output 64.

EXAMPLE 2

Examples of the sensor 60 include a proximity sensor (e.g., sensing that the housing 34 is suitably proximate the holster 58), a light sensor (e.g., sensing a corresponding light source (not shown) in the holster 58; sensing an absence of light when the device 32 is in the holster 58), a capacitive sensor (e.g., sensing a capacitance associated with the device 32 engaging the holster 58), and separable contacts (e.g., which are closed when they engage an electrical conductor (not shown) of the holster 58).

In this example, firmware 68 of the processor circuit 36 preferably automatically determines the different states 40,41,42, in order to select between the vibration intensities 46,47,48 based upon detection of one or more sensed events. For example, the firmware 68 employs the input 66 receiving the sensor output 64 to decide if the device 32 is "in-holster" or "out-of-holster". As another example, three states may be established based on whether the device 32 was sensed as being: (1) "in-holster"; (2) "out-of-holster", or (3) "out-of-holster" plus the condition of being "in-use" (e.g., when the user inputs to the input circuit 54, such as, for example, by typing on a keyboard (not shown)).

Key entry and/or user interface navigation triggers may also be employed to determine the third state of being "in-use" (e.g., "out-of-holster" and the user is typing; the sensor 60 is a capacitive sensor that senses human touch). For example, as soon as the user inputs to the input circuit 54 (e.g., depresses a key (not shown)), the device firmware 68 would presume the "in-use" state (e.g., state 42) and could, thereby, cause the control circuit 50 to automatically switch to a different vibration intensity (e.g., from intensity 47 to intensity 48). Later, after a suitable period of inactivity of the input circuit 54, as determined by the firmware 68, the output 38 switches back to appropriate state of "in-holster" or "out-of-holster" (e.g., state 40 or state 41) and the corresponding vibration intensity (e.g., intensity 46 or intensity 47). For example, this transition may occur whenever the device 32 goes into a slow-clock or sleep state.

For example, if the user tends to typically leave his/her device 32 sitting on a table or counter top, then the user may prefer a relatively reduced intensity of vibration as compared to a relatively increased intensity of vibration when "in-holster".

As another example, it may be preferred to have a relatively higher intensity of vibration when "out-of-holster" versus "in-holster" depending on the user's situation.

As a further example, if the device 32 is currently detected as being "in-use", then the user may prefer a relatively lower intensity of vibration while holding the device.

EXAMPLE 3

The input circuit 54 may include a microphone (not shown). The firmware 68 may determine if the handheld electronic device 32 is "in-use" based on input of a detected sound from the microphone to the processor circuit 36.

EXAMPLE 4

The output circuit 56 may include a speaker (not shown). The firmware 68 may determine if the handheld electronic device 32 is "in-use" based upon an output from the processor circuit 36 to the speaker.

EXAMPLE 5

The input circuit 54 may include a plurality of keys (not shown). The firmware 68 may determine if the handheld electronic device 32 is "in-use" based upon detected activity from one or more of the keys.

EXAMPLE 6

The firmware 68 may determine if the handheld electronic device 32 is not "in-use" based upon a predetermined period of time of no detected activity from the keys of Example 5.

EXAMPLE 7

The firmware 68 may cooperate with the input circuit 54, in order to provide the user with a user selection of "intelligent vibration" being on or off. If off, then the "intelligent vibration" selection is deactivated (e.g., by output state 69) and the device 32 only vibrates with a corresponding constant vibration intensity 69A. Otherwise, if the "intelligent vibration" selection is on and activated, then the control circuit 50 automatically causes the vibrator 44 to vibrate at one of the different vibration intensities 46,47,48 depending on the corresponding respective states 40,41,42 of the device 32 (e.g., in-holster; out-of-holster; out-of-holster and in-use).

Figure 3:
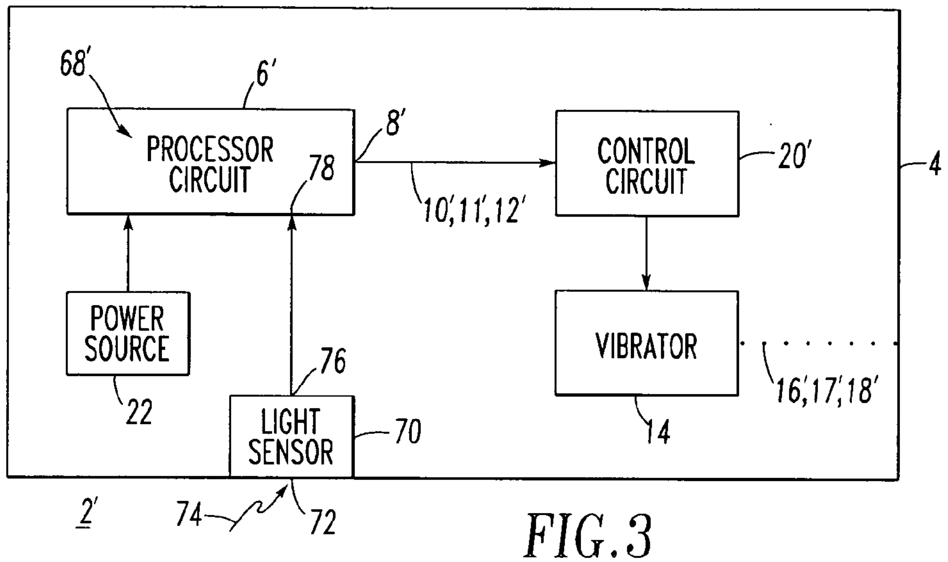

Referring to FIG. 3, another handheld electronic device 2' is somewhat similar to the device 2 of FIG. 1. The device 2' includes a light sensor 70 having an input 72 adapted to sense ambient light 74 and an output 76 responsive to such sensed ambient light. The processor circuit 6' includes an input 78 receiving the sensor output 76.

EXAMPLE 8

The control circuit 20' of FIG. 3 includes the light sensor 70, which is adapted to sense a plurality of different light intensity levels (e.g., the device 2' is stored in an object (not shown), such as, for example, a briefcase or a purse; the device 2' is left sitting open in a lighted room (not shown)). The processor circuit 6' includes firmware 68' adapted to determine if the device 2' is in-use (e.g., as was discussed above in connection with Example 2) and to output, responsive to the input 78 and whether the device 2' is in-use, a corresponding one of the different states 10',11',12' of the output 8' thereof. The control circuit 20 activates the vibrator 14 at one of the different vibration intensities 16', 17', 18' corresponding to the respective different states 10', 11', 12'.

For example, user selectable vibration intensities may be automatically switched based on whether the device 2' is sensed as being: (1) "in-use" (e.g., when the user is typing on a keyboard, talking into a microphone and/or listening to a speaker); (2) "non-use" and being stored in something (e.g., a purse; a briefcase); or (3) "non-use" and not being stored (e.g., sitting open on a table or counter in a lighted room). In this instance, the user may select, for example, a relatively lower vibration intensity while holding the device 2' for (1) "in-use" versus (3) a detected "non-use". Otherwise, if detected (e.g., through the light intensity sensor 70) as (2) "non-use" and being stored in something, then the user may set the vibration intensity to the relatively highest level.

Referring to FIG. 4, a handheld electronic device vibrator drive control circuit 80 is shown. A handheld electronic device processor circuit (μP) 82 includes a digital output 84. A handheld electronic device vibrator 86 includes a motor 88 having a first input terminal 90 and a second input terminal 92. The control circuit 80 includes a first circuit 94 adapted to output a substantially constant voltage 96 from a suitable supply voltage (+V) 97 to the motor first input terminal 90, and a second circuit 98 adapted to selectively enable the motor second input terminal 92 responsive to the µP digital output 84. Here, the µP 82 is adapted to pulse-width modulate the digital output 84 at a selectable duty cycle (A/B), which corresponds to the motor voltage 100. The motor 88, in turn, is adapted to rotate at a speed based upon the substantially constant voltage 100, which corresponds to the duty cycle of the pulse-width modulated (PWM) digital output 84. Hence, the intensity of the vibrator 86 varies directly with the motor voltage 100, which varies directly with the duty cycle (A/B) of the PWM digital output 84. No vibration occurs when the output 84 has about zero duty cycle. Although not shown, the second circuit 98 may be part of the µP 82.

EXAMPLE 9

The PWM output 84 may be provided by employing a suitable PWM output port (e.g., from a processor circuit or from an integrated circuit such as, for example, a melody integrated circuit). In some cases, such as certain melody integrated circuits, the PWM control port is an open drain that can sink suitable maximum motor current (e.g., typically about 150 mA). In other instances, a power FET, transistor, or the circuit 98 (FIG. 4) is employed to drive the relatively high motor current.

EXAMPLE 10

The PWM output 84 may provide a series of step resolutions, typically about 128, in order that the duty cycle and the average motor voltage 100 can be suitably varied.

For example, for a suitable vibrator motor (e.g., SANYO-RS 2561 marketed by Sanyo Sales and Supply Company of Bensenville, Ill.), the duty cycle of the PWM output 84, the calculated motor voltage, the measured motor voltage, the measured motor current and the measured motor revolutions per minute (RPM) of the motor 88 are shown in Table 1. For the example of Table 1, the voltage 96 is about 3.3 VDC.

Another alternative is to set the voltage 97 to about 3.3 VDC, and to adjust the voltage controlled current source circuit 94 to provide the voltage 96 at about 1.7 VDC. Thus, the resulting duty cycle can be varied from about 50% to about 100% to ensure the voltage across the vibrator motor 88 would never exceed the maximum rated voltage for this specific motor.

TABLE 1

| PWM Duty Cycle | Calculated Motor Voltage | Measured Motor Voltage | Measured Motor Current | Measured Motor RPM |
|---|---|---|---|---|
| 20% | 0.660 VDC | 0.658 VDC | 25 mA | 5,454 |
| 25% | 0.825 VDC | 0.840 VDC | 38 mA | 7,894 |
| 30% | 0.990 VDC | 1.000 VDC | 48 mA | 8,333 |
| 35% | 1.155 VDC | 1.159 VDC | 60 mA | 8,823 |
| 40% | 1.320 VDC | 1.310 VDC | 71 mA | 9,836 |
| 45% | 1.485 VDC | 1.470 VDC | 82 mA | 10,714 |
| 50% | 1.650 VDC | 1.630 VDC | 93 mA | 11,538 |
| 55% | 1.815 VDC | 1.770 VDC | 108 mA | 12,000 |

In the above example of Table 1, the motor 88 is guaranteed to start if the duty cycle is greater than about 30%, although, after it is running, the duty cycle may be reduced to about 20%. The vibrator motor 88 response to the change in the duty cycle is almost instantaneous.

There is a potential for power savings by employing a variable PWM drive method or by lowering the DC voltage level. For example, if the user sets the vibrator 86 for the lowest PWM duty cycle setting (e.g., about 1 VDC), which is a 30% PWM duty cycle in this example, then the motor current will be at about 50 mA and, then, the power employed by the vibrator 86 is about 50 mW. If the vibrator 86 is driven with straight 1.5 VDC, or closer to about 45% PWM duty cycle, then the motor current is about 82 mA and the power is about 123 mW. Hence, the power savings at about 30% PWM duty cycle could be about 73 mW, which is a relatively large amount.

Referring to FIG. 5, another handheld electronic device vibrator linear drive control circuit 110 is shown. As in FIG. 4, the handheld electronic device vibrator 86 includes the motor 88 having the first and second input terminals 90,92. Here, the output 112 of a processor circuit 114 is a digital-to-analog output with a voltage 116. The control circuit 110 includes an input 118 of the digital-to-analog output 112 of the processor circuit 114 and an output 120 to the input terminal 90 of the motor 88. The processor circuit 114, which includes a suitable microcontroller (µC) 122 and a digital-to-analog converter (DAC) 124, is adapted to change the voltage 116 of the digital-to-analog output 112. The control circuit 110 is adapted to responsively change the motor voltage 100. In turn, the motor 88 rotates at a speed (or stops rotation) corresponding to the voltage 100 thereof.

By employing a controllable PWM motor control circuit 80 (FIG. 4) or by directly changing the DC level across the motor 88 with the linear drive control circuit 110 (FIG. 5), the intensity of the vibration that a user feels changes as well. In both methods, the intensity changes by varying the average voltage 100 across the motor 88, thereby proportionally varying the motor RPM.

EXAMPLE 11

The user may be presented (e.g., through output circuit 56 of FIG. 2) with a range of vibration intensities from relatively low to relatively high. The lowest setting represents the minimum duty cycle required to generate enough RMS voltage across the motor 88 (FIGS. 4 and 5), in order for the vibrator 86 to operate (e.g., for the PWM drive control circuit 80 of FIG. 4 it may be about 30% duty cycle; for the direct linear drive control circuit 110 of FIG. 5, it may be about 1.1 VDC). Since most motors require a suitable initial start-up current, the control circuits 80,110 would be directed to provide this for a suitable time (e.g., a few milliseconds). After the motor 88 is turning, the motor's average voltage level can be reduced. The highest setting would represent the maximum duty cycle permitted (e.g., a duty cycle as permitted by vibrator RPM and as permitted by maximum allowed average RMS voltage).

EXAMPLE 12

For another vibrator motor (e.g., model 4CR-1002W-05 marketed by Namiki Precision of 79 Anson Road, Singapore), the motor load current is about 130 mA, the motor speed is about 10,909 RPM and the supply voltage 96 is about 1.3 VDC.

Figure 6:
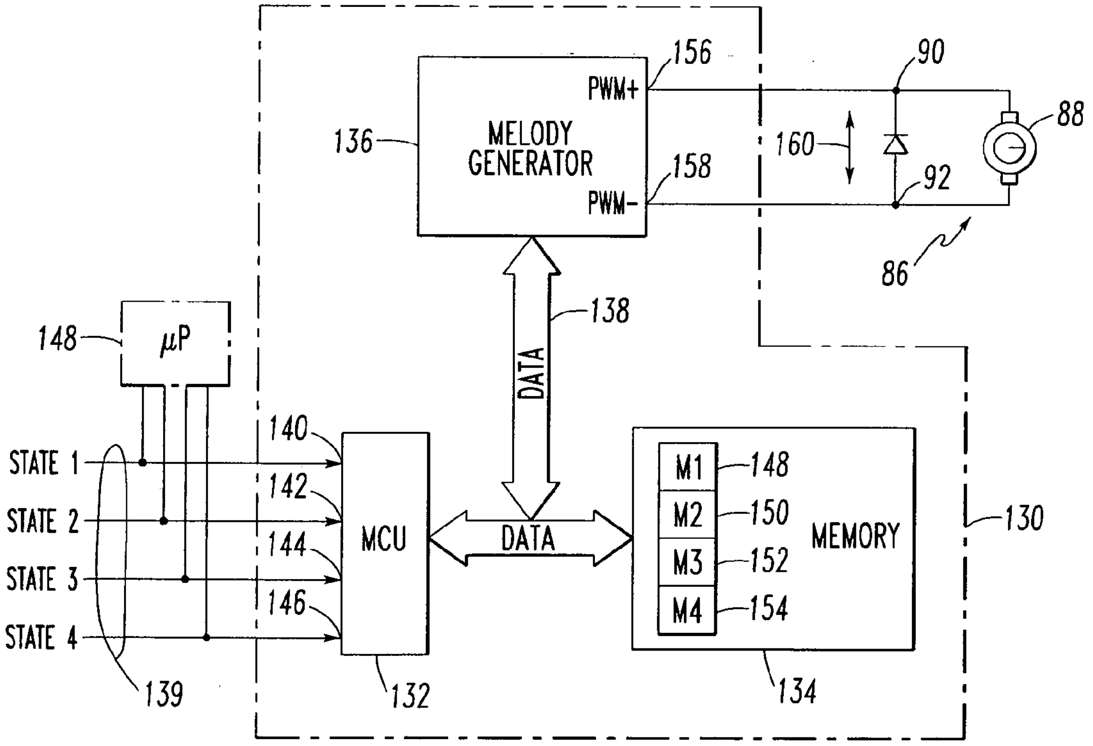
FIG. 6 is a block diagram in schematic form of another handheld electronic device vibrator drive control circuit in accordance with another embodiment of the invention.

FIG. 6 shows another handheld electronic device vibrator drive control circuit 130. The circuit 130 may be formed from a conventional melody integrated circuit or from discrete components. The circuit 130 includes a microcontroller unit (MCU) 132, a suitable memory 134, a melody generator 136 and a data bus 138. The MCU 132 receives state information 139 on inputs 140,142,144,146 from a microprocessor (μP) 148 or from the processor circuits 6 and 36 of respective FIGS. 1 and 2. The MCU 132 communicates with the memory 134 and the melody generator 136 over the data bus 138. For example, the memory 134 includes a plurality of sets of melody parameters (M1, M2, M3, M4) 148,150,152,154 corresponding to the respective inputs (STATE 1, STATE 2, STATE 3, STATE 4) 140,142, 144,146. Whenever the μP 148 sets one of the inputs 140,142,144,146, the MCU 132 responsively transfers the corresponding set of the melody parameters 148,150,152, 154 to the melody generator 136. In turn, the melody generator 136 responsively generates PWM outputs 156 (PWM+) and 158 (PWM−), in order to provide a suitable voltage versus time waveform 160 that drives the vibrator 86. In response, the RPM of the motor 88 follows the waveform 160, such that the resulting variable vibration versus time response of the vibrator 86 mimics the melody that corresponds to the state information 139 of the μP 148.

Figure 7:
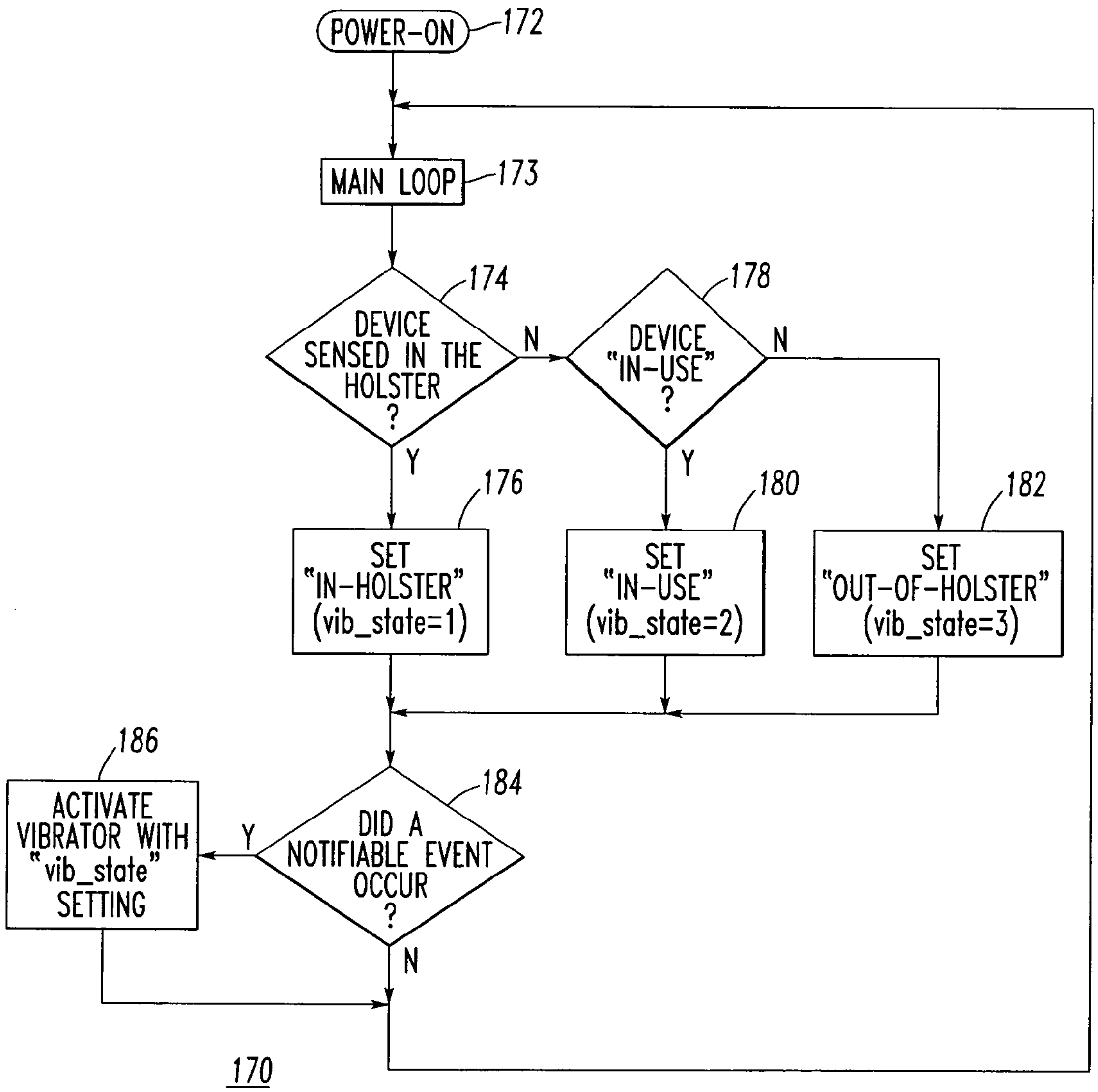
FIG. 7 is a flowchart of a routine executed by the processor circuit of FIG. 2.

Referring to FIG. 7, a flowchart of a routine 170 executed by the processor circuit 36 (e.g., including a μP) of FIG. 2 is shown. After power-on initialization at 172, a main loop 173 of the handheld electronic device 32 is executed at 173. As a non-limiting example, the main loop 173 may include a wide range of one or more applications, such as, for example, any suitable handheld electronic device function(s), word processing applications, spreadsheet applications, calendar functions, address book functions, journal entry functions, notification functions (e.g., e-mail messages, telephone messages, telephone calls, SMS messages, calendar events, meeting notifications, personal alerts, alarms, warnings, stock quotes, news bulletins, other web browser events), task list functions, alarm functions, web browser functions, e-mail functions, telephone functions and/or SMS messaging functions. Next, at 174, it is sensed through sensor 60 if the device 32 is in the holster 58. If so, then, at 176, the "in-holster" state (e.g., vib_state=1) is set before execution resumes at 184. On the other hand, if the device 32 is not in the holster 58, then, at 178, it is determined if the device 32 is in-use (e.g., Did the input circuit 54 receive an input in a previous predetermined time period? Was an output sent to the output circuit 56 in a previous predetermined time period?). If so, then, at 180, the "in-use" state (e.g., vib_state=2) is set before execution resumes at 184. Otherwise, if the device 32 is not in the holster 58 and is not in-use, then, at 182, the "out-of-holster" state (e.g., vib_state=3) is set before execution resumes at 184.

Next, at 184, after 176, 180 or 182, it is determined if the main loop 173 determined a notifiable event. Non-limiting examples of notifiable events include, for example, e-mail messages, telephone messages, telephone calls, SMS messages, calendar events, meeting notifications, personal alerts, alarms, warnings, stock quotes, news bulletins and other web browser events. If so, then at 186, the vibrator 44 is activated through the control circuit 50 with one of the different intensities 46,47,48 (FIG. 2), which corresponds to the states of steps 176,180,182. Finally, after either 184 or 186, the main loop 173 is repeated. This permits the handheld electronic device 32 to employ a plurality of different vibration intensity levels, and to selectively vibrate such device at those different vibration intensity levels.

Figure 8:
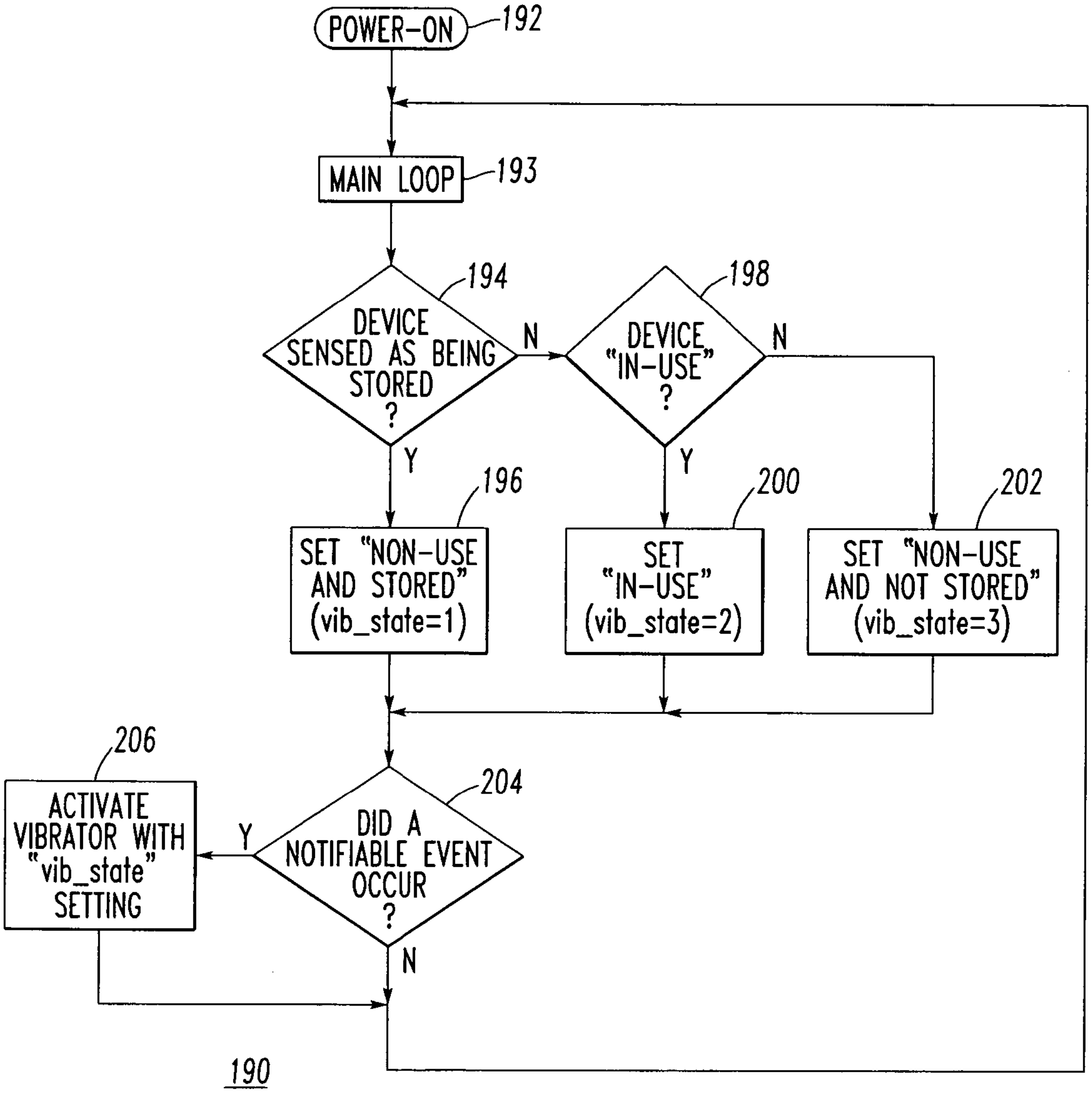
FIG. 8 is a flowchart of a routine executed by the processor circuit of FIG. 3.

FIG. 8 shows a flowchart of a routine 190 executed by the processor circuit 6' (e.g., including a μP) of FIG. 3. After power-on initialization at 192, a main loop 193 of the handheld electronic device 2' is executed at 193. As a non-limiting example, the main loop 193 may be the same or similar to the main loop 173 of FIG. 7. Next, at 194, it is sensed through light sensor 70 if the device 2' is stored. If so, then, at 196, the "non-use and stored" state (e.g., vib_state=1) is set before execution resumes at 204. On the other hand, if the device 2' is not stored, then, at 198, it is determined if the device 2' is in-use. If so, then, at 200, the "in-use" state (e.g., vib_state=2) is set before execution resumes at 204. Otherwise, if the device 2' is not stored and is not in-use, then, at 202, the "non-use and not stored" state (e.g., vib_state=3) is set before execution resumes at 204.

Next, at 204, after 196, 200 or 202, it is determined if the main loop 193 determined a notifiable event (e.g., as was discussed above in connection with step 173 of FIG. 7). If so, then at 206, the vibrator 14 is activated through the control circuit 20' with one of the different intensities 16',17',18' (FIG. 3), which corresponds to the states of steps 196,200,202. Finally, after either 204 or 206, the main loop 193 is repeated.

Figure 9A:
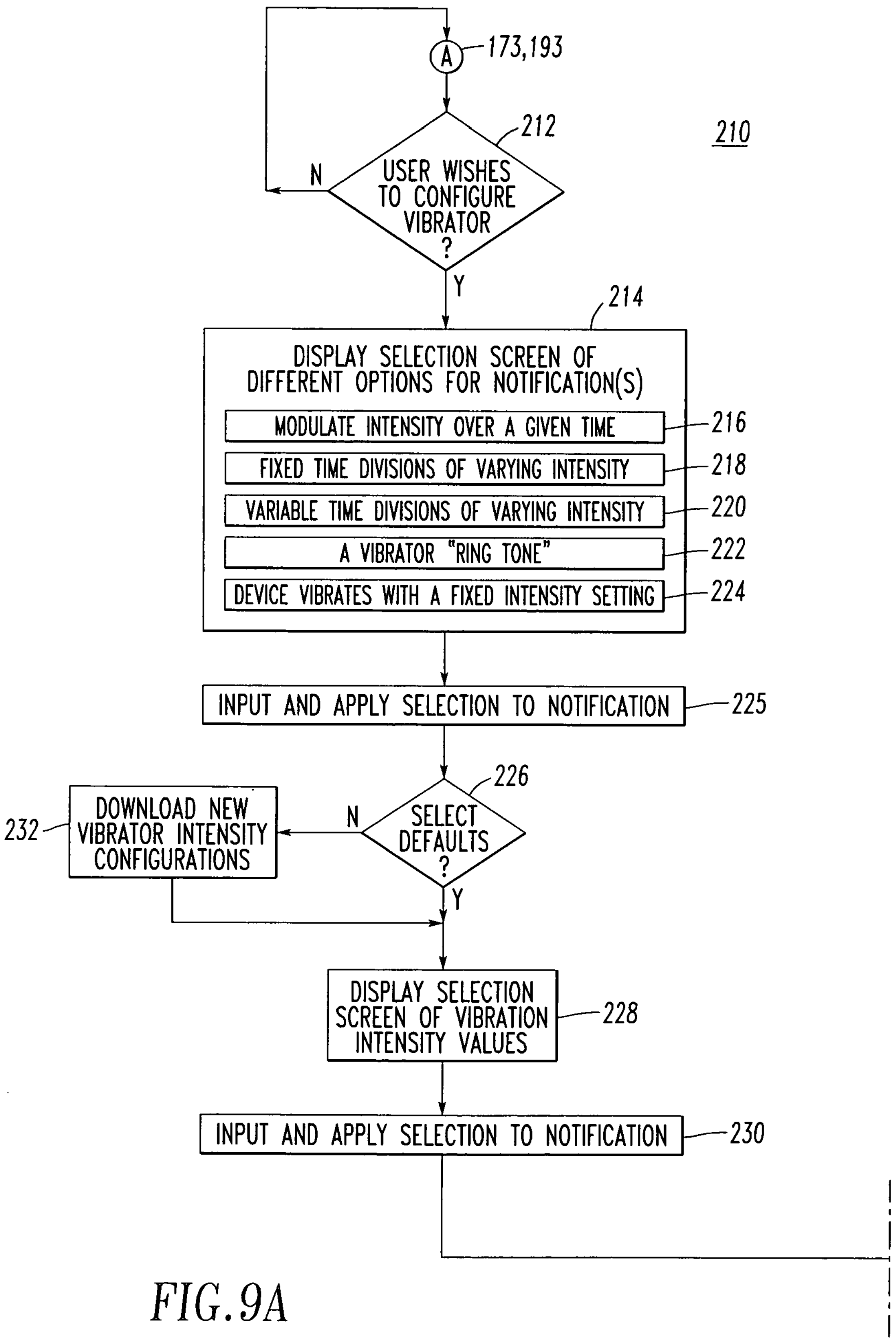
FIGS. 9A–9B form a flowchart of a configuration routine for a handheld electronic device in accordance with another embodiment of the invention.
Figure 9B:
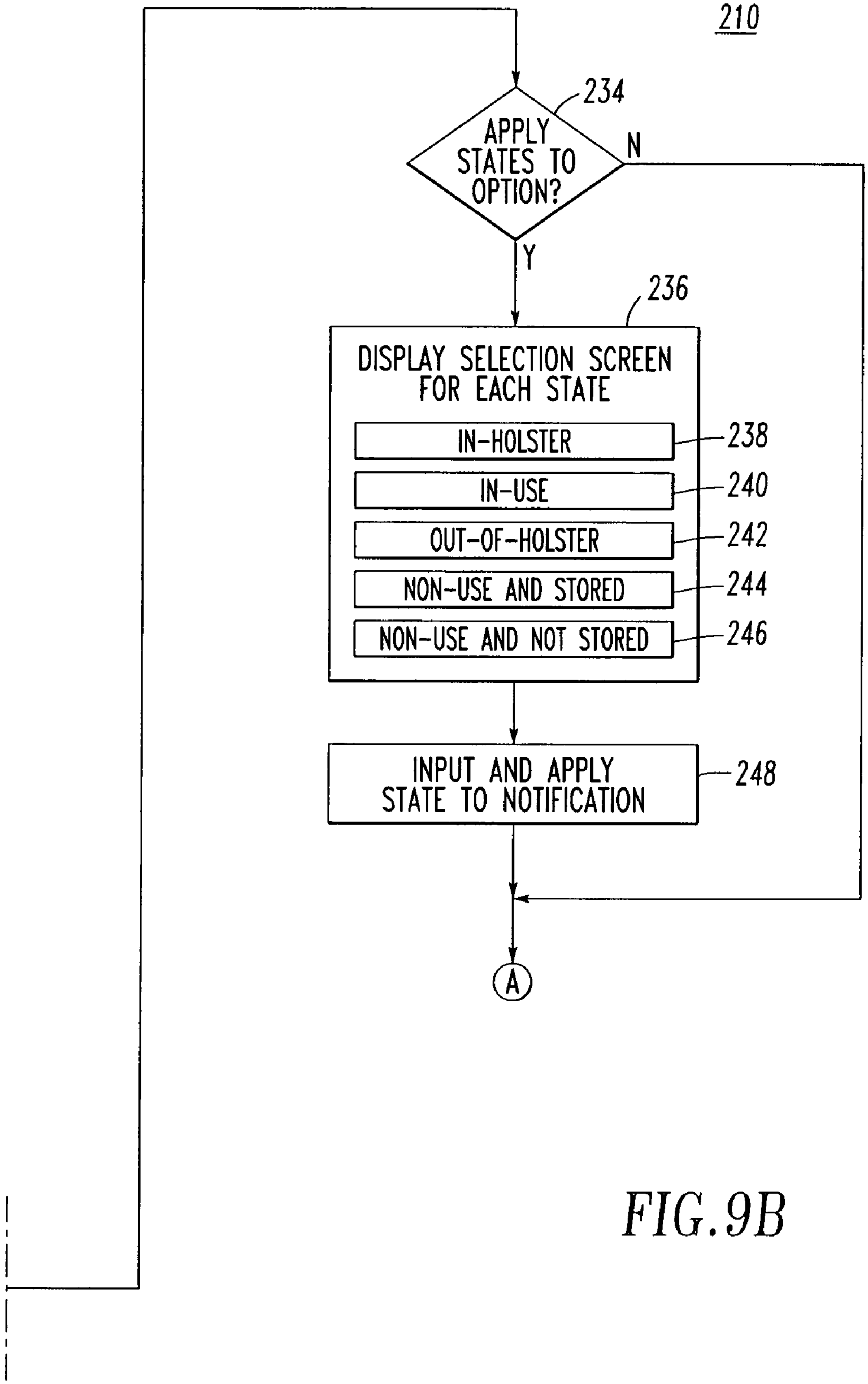

FIGS. 9A–9B show a configuration routine 210, which may be executed as part of the main loop 173 of FIG. 7 or the main loop 193 of FIG. 8. First, at 212, it is determined if the user wishes to configure the vibrator (e.g., 44 of FIG. 2 or 14 of FIG. 3). Preferably, this configuration may apply to one, some or all of the notifiable events (e.g., as determined at 184 of FIG. 7 or 204 of FIG. 8). In other words, a common configuration may be applied to all of the notifiable events or unique configurations may be applied to one or more of those notifiable events. If configuration is desired, then at 214, a selection screen is displayed (e.g., through the output circuit 56 of FIG. 2) including different options for the notification(s). Those options may include one or more of the following methods for employing the vibrator: (1) change the vibration intensity over a predetermined time period 216; (2) employ fixed time divisions of varying vibration intensity 218; (3) employ variable time divisions of varying vibration intensity 220; (4) employ a vibrator "ring tone" 222 (e.g., a "melody" as was discussed above in connection with FIG. 6; any one, two or all three of items (1), (2) and/or (3), above); and (5) employ a fixed vibration intensity setting 224. Next, at 225, one of the options 216,218,220,222,224 is input and applied to the notification(s) of interest.

Then, at 226, it is determined if the user wishes to employ default vibration intensity values. If so, then at 228, a selection screen (e.g., a menu of items on a display screen of the output circuit 56 of FIG. 2) is displayed including all of the possible vibration intensity values. Next, at 230, one of the default vibration intensity values is input (e.g., by selecting one of the different vibration intensity levels from a suitable user input device, such as a keyboard (not shown), of the input circuit 54 of FIG. 2; as discussed below in connection with Example 16) and applied to the notification(s) of interest. On the other hand, if the user does not wish to employ default values (or wishes to consider other possible values), then at 232, new vibration intensity configurations are downloaded by the handheld electronic device 32 (e.g., employing a wireless port (not shown) or the Internet (not shown)) before step 228 is executed. After 230, at 234, it is determined if the user wishes to apply device states to the selected option. If not, then the main loop (e.g., 173 or 193) is repeated. Otherwise, at 236, a selection screen is displayed including the various possible states. Those states may include one or more of: (1) in-holster 238; (2) in-use 240; (3) out-of-holster 242; (4) non-use and stored 244; and (5) non-use and not stored 246. For example, the states 238,244 might correspond to relatively high values of vibration intensity, the states 242,246 might correspond to a relatively moderate values of vibration intensity, while the in-use state 240 might correspond to a relatively low value of vibration intensity. Again, those states could be the same or different as applied to the different types of notifiable events. Finally, at 248, the states are input and are applied to the notification(s). This permits, for example, a received e-mail message when “in-holster” to provide a first intensity, a received e-mail message when “in-use” to provide a second intensity, an alarm when “out-of-holster” to provide a third intensity, and an alarm when “in-holster” to provide a fourth intensity.

EXAMPLE 13

In FIG. 7, step 186 of the routine 170 may output to the control circuit 50 (FIG. 2) one intensity state (vib_state=3) after the sensor 60 senses the out-of-holster state at 174, and another greater intensity state (vib_state=1) after the sensor 60 senses the in-holster state at 174. In response, the control circuit 50 activates the vibrator 44 at a first vibration intensity corresponding to the one intensity state (vib_state=3) and at a second greater vibration intensity corresponding to the other greater intensity state (vib_state=1).

EXAMPLE 14

In addition to Example 13, step 186 of the routine 170 may output to the control circuit 50 (FIG. 2) yet another intensity state (vib_state=2) after the sensor 60 senses the out-of-holster state at 174 and after the processor circuit 36 determines that the handheld electronic device 32 is in-use at 178. In response, the control circuit 50 activates the vibrator 44 at an intermediate vibration intensity corresponding to the intensity state (vib_state=2).

EXAMPLE 15

In FIGS. 7 and 8, the in-use determination, at 178 and 198, respectively, may include the detection of the activation of another routine in the respective main loops 173 and 193. For example, this might include a navigation trigger where the user activates one routine from another. For example, a key (not shown) pressed or a navigation event interrupt routine (not shown) is invoked when user input is determined (e.g., by input circuit 54 of FIG. 2). A software flag (not shown) would then be set to indicate or to send a message of “in-use” for the first routine to act upon.

EXAMPLE 16

In FIG. 2, the input circuit 54 may include a suitable user input device 254 (e.g., a keypad; an input module; one or more main navigation keys of a keyboard; a mini-joystick; a track wheel) including a first position and a second position, and the output circuit 56 may include a suitable display device 256 (e.g., a display having a bar-meter; an output module). The user input device 254 is employed to adjust the display device 256, which tracks changes in the vibration intensity level of the vibrator 44.

For example, turning a track wheel clockwise increases the vibration intensity, while turning the track wheel counter-clockwise decreases the vibration intensity. This permits the user to select a first one of the different vibration intensity levels responsive to the first position of the user input device 254, and to select a different second one of the different vibration intensity levels responsive to the second position of such user input device.

As a further example, in connection with the control circuit 80 of FIG. 4, the track wheel may be employed to adjust a bar-meter presented on the display device 256. The bar meter tracks changes to the duty cycle of the vibrator 86. Turning the track wheel clockwise, for example, would increase the PWM duty cycle (and, thus, the vibration intensity), and turning the track wheel counter-clockwise would decrease the PWM duty cycle (and, thus, the vibration intensity).

EXAMPLE 17

As another example, the display device 256 may present the user with a discrete range or a continuous range of the different vibration intensity levels. The user may employ the user input device 254 to select one of the different vibration intensity levels from the range.

EXAMPLE 18

As a preferred practice, as was discussed above in connection with FIGS. 7, 8, 9A and 9B, the handheld electronic devices 32 (FIG. 2) and 2' (FIG. 3) may include a plurality of different operating states, such as 238,240,242,244,246 and/or other operating modes, and the routines 170,190 automatically determine a current one of the different operating states, and automatically vibrate the corresponding handheld electronic device at a corresponding one of the different vibration intensity levels based upon the determined current one of the different operating states.

EXAMPLE 19

As a more specific example to Example 18, the different operating modes may include executing a first application routine (e.g., e-mail), and executing a second different application routine (e.g., calendar). As a result, notifications associated with the first application routine (e.g., e-mail received) may have a different vibration intensity (e.g., greater; smaller) with respect to notifications associated with the second different application routine (e.g., calendar events).

EXAMPLE 20

As a specific example of step 232 of FIG. 9A, the user may choose one of a set of customized vibration “ring tones” depending on the state of the handheld electronic devices 32 (FIG. 2) and 2' (FIG. 3) and/or the type of notification. For example, the user may download from a selection of predetermined vibration intensity settings from a server (not shown). These settings may include further variations of device default vibration intensity settings to time variable and/or vibration intensity variable settings that mimic a musical melody. For example, the server may include a suitable utility (not shown) to translate a song melody to the time variable and vibration intensity variable settings.

EXAMPLE 21

As more specific examples of the options 216,218,220 of FIG. 9A, in which the user initially vibrates the handheld electronic device at a selected one of the different vibration intensity levels and then changes the vibration intensity levels, in order to provide a progressively escalating vibration intensity type of notification, the user may choose to have the vibrator notification gradually increase in intensity by: (1) a continuous gradual increase in vibration intensity; (2) a series of increasingly intense "pulses" of vibration; or (3) a continuous gradual increase in vibration intensity for only a predetermined time.

EXAMPLE 22

For FIGS. 9A–9B, the various selected vibration intensity values, options and state information settings may advantageously be input by the user through a user profile screen (not shown) of the input circuit 54 of FIG. 2.

EXAMPLE 23

Option 216 of FIG. 9A may continuously change the selected vibration intensity level for corresponding notification event(s) over time or over a predetermined time interval. This may be based on a song melody and may be implemented, for example, with the control circuit 130 of FIG. 6.

EXAMPLE 24

Option 218 of FIG. 9A may vibrate the handheld electronic device with a plurality of discrete vibration pulses. These discrete vibration pulses have different vibration intensities and constant vibration pulse lengths. This may be based on a song melody and may be implemented, for example, with the control circuit 130 of FIG. 6.

EXAMPLE 25

Option 218 of FIG. 9A may include increasing the selected one of the different vibration intensity levels by employing a continuous gradual increase in vibration intensity, such as, for example, a series of increasingly intense "pulses" of vibration.

EXAMPLE 26

Option 220 of FIG. 9A may vibrate the handheld electronic device with a plurality of discrete vibration pulses. These discrete vibration pulses may have the same or different vibration intensities and may have a plurality of different vibration pulse lengths (e.g., mimicking Morse Code).

EXAMPLE 27

Option 220 of FIG. 9A may include changing both the time of vibration and the intensity of vibration of the handheld electronic device over time. Hence, successive pulses of vibration have both different pulse widths and different vibration intensities.

EXAMPLE 28

Option 222 of FIG. 9A provides a time variable vibration intensity that mimics a "ring tone" (i.e., including a plurality of vibrator intensities that vary over time). Such a "ring tone" may be locally defined by the handheld electronic device or may be downloaded to it.

EXAMPLE 29

As was discussed above in connection with FIGS. 9A–9B, the user may choose one of a set of customized vibration tones depending on the type of notification event (e.g., e-mail; calendar; telephone; alarm) and/or the state of the handheld electronic device (e.g., in-use; holstered; out-of-holster; non-use and stored; non-use and not stored).

Customized vibration tones may take the form of vibrations, which vary differently over time by: (1) continuously changing the intensity over time, (2) sending fixed-time pulses each with different intensities (that could be based on a song melody), (3) sending a series of pulses of varying length (e.g., mimicking Morse Code), and/or (4) all of items (1)–(3).

EXAMPLE 30

The user may selectively disable through the input circuit 54 (FIG. 2): (1) all vibration of the handheld electronic device; (2) vibration of the handheld electronic device for one or more notification events; (3) one, some or all of the options 216,218,220,222,224 of FIG. 9A; and/or (4) cause all notification events to be notified at the same vibration level.

EXAMPLE 31

As a refinement to Example 21, the user may manually deactivate the vibration before it becomes unnecessarily intense. For example, by starting with a relatively "soft" vibration intensity and by increasing that intensity over time, the user can then deactivate the vibration (e.g., through the input circuit 54 of FIG. 2) before the vibration intensity becomes unnecessarily intense (e.g., such as when the user is in a meeting).

EXAMPLE 32

As another refinement to Example 21, the user may un-holster the device 32 from the holster 58 of FIG. 2, in order to deactivate the constant or increasing vibration.

EXAMPLE 33

By selecting or deselecting the option 224 of FIG. 9A for a particular type of notification event, the user may disable or enable escalating intensity of vibrator notification for one, some or all of the different types of notification events.

EXAMPLE 34

The configuration routine 210 of FIGS. 9A–9B may present the user with a list (not shown) for user selection of "vibrator patterns" each of which may include one or more implementation options (e.g., steps 216, 218, 220, 222, 224). This list may include plural vibrator patterns (e.g., "vibrator_pattern1"; vibrator_pattern2"). As the user scrolls over the list, the corresponding vibrator 44 (FIG. 2) would respond with the appropriate response of vibration intensity(s) that is currently highlighted in the list (e.g., through output circuit 56 of FIG. 2). In this manner, the user may intuitively select the desired vibrator pattern by being able to "feel" it first.

EXAMPLE 35

Figure 10:
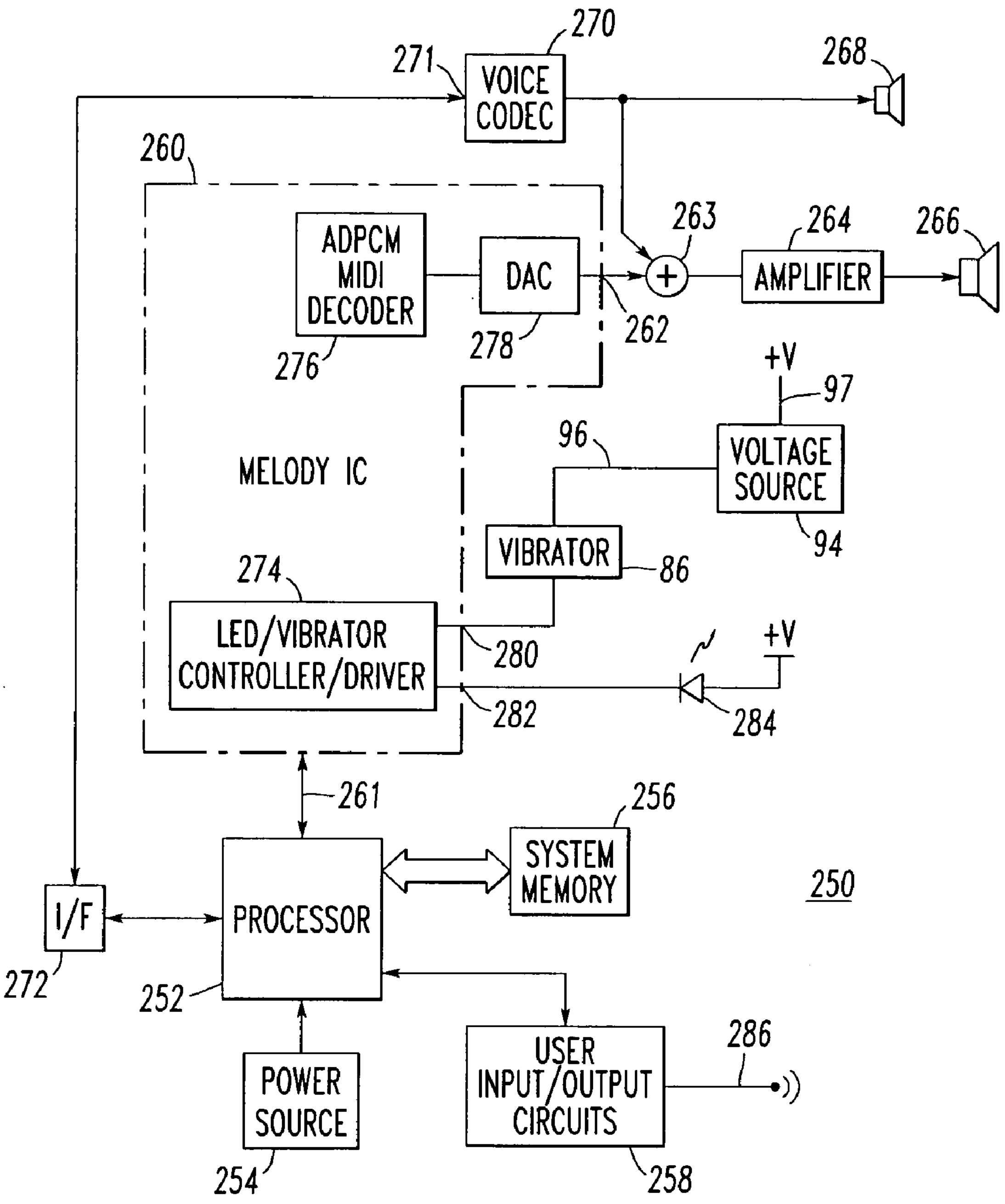
FIG. 10 is a block diagram in schematic form of a handheld electronic device including a vibrator drive control circuit in accordance with another embodiment of the invention.

Referring to FIG. 10, a handheld electronic device 250 includes a suitable processor 252, a suitable power source 254 powering such processor, a system memory 256 for the processor and user input/output circuits 258. A melody integrated circuit (IC) 260 interfaces the processor 252 through a suitable interface 261 (e.g., a parallel bus; a serial interface). The melody IC 260 provides a vibrator drive control circuit for the vibrator 86 of FIG. 6 and a sound output port through analog output 262. The analog output 262 is input by a multiplexer 263 that feeds an amplifier 264, which drives a speaker 266. The multiplexer 263 is also fed by an analog output from a voiceband codec circuit 270 that drives another speaker 268. The output/input 271 of the circuit 270 is input/output by a suitable serial interface (I/F) 272 for input/output by the processor 252.

An example of the melody IC 260 is a model ML2870AGD marketed by OKI Semiconductor of Tokyo, Japan. The melody IC 260 includes, for example, a CPU interface section (not shown) for the interface 261, a FIFO section (not shown), a hardware sequencer section (not shown), an LED/vibrator controller/driver section 274, an ADPCM MIDI decoder section 276 and a digital-to-analog converter (DAC) 278. The section 276 and DAC 278 cooperate to provide analog signals to the output 262 to drive the speaker 266. The section 274 provides an open drain PWM port output 280 for driving the vibrator 86. By setting a bit in a configurable register (not shown), the PWM port output 280 is switched to the section 274. For example, when the output 280 is low, the vibrator 86 is on; when the output 280 is in a high impedance state, then the vibrator 86 is off. To change the vibration intensity, the processor 252 sends a new value to be written to the PWM vibrator register (not shown) of the section 274 through interface 261. Another open drain output 282 may be employed to control the on/off/color states of LED 284.

EXAMPLE 36

The handheld electronic device 250 of FIG. 10 may be a wireless handheld communication device including, as part of the circuits 258, a wireless communication port 286.

EXAMPLE 37

Table 2, below, shows examples of "sensed" locations of a handheld electronic device and corresponding sample configurable vibration intensity levels (e.g., ranging from 0 (off) to 1 (low) to 5 (high)) for particular example applications. In this example, the user sets up one or more discrete profiles when in a meeting or when significant disturbances are sought to be avoided, in order that notifications are to be as quiet as possible. Although five example vibration intensities are shown, it will be appreciated that a wide range of different vibration intensity levels, types and counts may be employed.

TABLE 2

| Notification Type - Event | In-Holster | Out-of-Holster | In-Use | Stored |
|---|---|---|---|---|
| Calendar - Spouse's birthday | 5 | 4 | 3 | 5 |
| Calendar - Meeting notification | 3 | 2 | 1 | 5 |
| E-mail - High priority e-mail while user is in a meeting (e.g., if user setup a "discrete" profile) | 2 | 1 | 2 | 3 |
| E-mail - Low priority e-mail while user is in a meeting (e.g., if user setup a "discrete" profile) | 0 | 0 | 1 | 0 |
| Telephone - Incoming call while user is in a meeting (e.g., if user setup a "discrete" profile) | 2 | 1 | 2 | 3 |
| E-mail - Normal priority | 3 | 3 | 1 | 4 |
| Telephone - Incoming call | 4 | 3 | 2 | 5 |

EXAMPLE 38

As a variation of Example 27, relatively higher vibration intensity level settings can typically be applied for a relatively shorter time duration than that of relatively lower vibration intensities, in order to be recognized by the user. For example, a 50 ms duration may suffice with a relatively higher intensity setting, but a 200 ms duration may be required with a relatively lower intensity for the user to sense the vibration.

EXAMPLE 39

As a variation to Example 1, the operating mode of navigation in progress may include, for example, use of the vibrator 44 of FIG. 2 during user navigation when employing the input and outputs circuits 54 and 56, respectively. For example, the vibrator 44 may be briefly enabled at a particular vibration intensity as the user traverses across plural menu selections (not shown) of the output circuit 56. In the application of this example, the user may select and configure the vibration intensity levels (e.g., one of two, three or more different vibration intensity levels).

EXAMPLE 40

As a variation to FIG. 4, a 3 VDC motor, such as 88, may be employed. In this example, the motor terminal 90 of FIG. 4 would be electrically connected to about 3.3 VDC at 97 (+V) through a suitably small value of resistance (not shown), such that the voltage at the motor terminal 90 would be about 3 VDC. It will be appreciated, however, that a wide range of vibrator motor types and/or voltages may be employed.

EXAMPLE 41

Although FIGS. 7, 8 and 9A–9B show a serial processing flow, the invention is applicable to handheld electronic devices that may employ a multi-threaded processing environment.

EXAMPLE 42

As a variation of Example 37, the user may selectively adjust all of the vibration intensity levels by a predetermined or configurable increment or decrement value (e.g., +2; +1; −1; −2). It will be appreciated, however, that such an adjustment may be implemented by software, by a suitable digital circuit (not shown) or by suitable analog circuit (e.g., that adjusts the voltage 96 of FIG. 4) (not shown).

The disclosed control circuits 20,20',50,80,110,130,260 permit different average and/or time variable voltages to appear across vibrator motor terminals, in order to create a range of vibration intensity levels through variable motor RPM. This permits a plurality of different vibration intensity levels and/or time variable vibration intensities to be provided for different notification events and/or for different handheld electronic device states.

Adjustable vibration intensity levels give the user another option to improve his/her experience with handheld electronic devices.

This further permits the user to provide decreased handheld device power consumption if, for example, the user is a relatively heavy device user and if the user chooses to employ a reduced vibration intensity notifications. For example, the current drawn by the vibrator motor 88 (FIGS. 4–6), while active, can be reduced proportionally to the vibrator motor RPM by lowering the required average voltage across the motor terminals.

The invention gives the user a broader range of notification options versus a series of on/off vibrations, which are all at the same vibration intensity level. Furthermore, the user may personalize the vibration intensity to their own "sensitivity" level by selecting from a range of different vibration intensity level settings.

Although example control circuits 20,20',50,80,110,130, 260 are disclosed, it will be appreciated that a wide range of analog, digital and/or processor-based circuits may be employed.

While for clarity of disclosure reference has been made herein to the exemplary display 256 for displaying vibration intensity information, it will be appreciated that such information may be stored, printed on hard copy, be computer modified, or be combined with other data. All such processing shall be deemed to fall within the terms "display" or "displaying" as employed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A handheld electronic device comprising:

a housing;

a processor circuit including a plurality of different operating states including an in-use state and a non-use state, and an output having a plurality of different states corresponding to at least some of said different operating states including a first intensity state corresponding to said in-use state and a second different intensity state corresponding to said non-use state;

a vibrator within said housing, said vibrator adapted to vibrate said housing at a plurality of different intensities;

a control circuit adapted to activate said vibrator at a first one of said different intensities responsive to the first intensity state of the output of said processor circuit and corresponding to said in-use state of said different operating states, and at a second one of said different intensities responsive to the second different intensity state of the output of said processor circuit and corresponding to said non-use state of said different operating states; and a power source adapted to power at least one of said processor circuit, said vibrator and said control circuit.

2. The handheld electronic device of claim 1 wherein the output of said processor circuit is a digital-to-analog output with a voltage; wherein said vibrator includes a motor having an input with a voltage; and wherein said control circuit includes an input of the digital-to-analog output of said processor circuit and an output to the input of said motor, said processor circuit adapted to change the voltage of said digital-to-analog output, said control circuit adapted to responsively change the voltage of said motor, said motor adapted to rotate at a speed corresponding to the voltage thereof.

3. The handheld electronic device of claim 1 wherein the output of said processor circuit is a digital output; wherein said vibrator includes a motor having a first input terminal and a second input terminal; and wherein said control circuit includes a first circuit adapted to output a substantially constant voltage to the first input terminal of said motor, and a second circuit adapted to selectively enable the second input terminal of said motor responsive to the digital output of said processor circuit, said processor circuit adapted to pulse-width modulate said digital output, said motor adapted to rotate at a speed based upon said substantially constant voltage and said pulse-width modulated digital output.

4. The handheld electronic device of claim 1 wherein said processor circuit comprises a processor; wherein said control circuit comprises a melody circuit receiving the output of said processor circuit and outputting a pulse-width modulated output; and wherein said vibrator includes a motor powered by said pulse-width modulated output.

5. The handheld electronic device of claim 1 wherein said different operating states further include at least one of the group comprising in-holster, out-of-holster, non-use and stored, and non-use and not stored; and wherein said processor circuit further includes a plurality of different notification events of said handheld electronic device, and a routine adapted to determine a current one of said different operating states and to output said different states corresponding to a current one of said different notification events and the determined current one of said different operating states.

6. The handheld electronic device of claim 1 wherein said control circuit includes a light sensor adapted to sense a plurality of different light intensity levels; wherein said processor circuit further includes a routine adapted to determine if said handheld electronic device is in said in-use state, said routine, responsive to said sensed different light intensity levels and whether said handheld electronic device is in said in-use state, outputs the first intensity state of the different states of the output thereof; and wherein said control circuit activates said vibrator at the first one of said different intensities corresponding to said first intensity state of the different states.

7. The handheld electronic device of claim 1 wherein said processor circuit further includes a wireless communication port.

8. A handheld electronic device comprising:

a housing adapted to engage a holster;

a sensor including an input adapted to sense engagement of said housing with said holster and an output responsive to said sensed engagement, said output responsive to said sensed engagement including one of an out-of-holster state and an in-holster state;

a processor circuit including a plurality of different operating states including an in-use state and a non-use state, a routine, an input receiving the output of said sensor, and an output having a plurality of different states including a first intensity state corresponding to said in-use state, a second different intensity state corresponding to said non-use state and a third different intensity state;

an input circuit cooperating with said processor circuit;

an output circuit cooperating with said processor circuit;

a vibrator within said housing, said vibrator adapted to vibrate said housing at a plurality of different intensities;

a control circuit adapted to activate said vibrator at a first one of said different intensities responsive to the first intensity state of the output of said processor circuit and corresponding to said in-use state of said different operating states, at a second one of said different intensities responsive to the second different intensity state of the output of said processor circuit and corresponding to said non-use state of said different operating states, and at a third one of said different intensities responsive to the third different intensity state of the output of said processor circuit; and a power source adapted to power at least one of said processor circuit, said vibrator and said control circuit.

9. The handheld electronic device of claim 8 wherein said sensor is selected from the group comprising a proximity sensor; a light sensor; and a capacitive sensor.

10. The handheld electronic device of claim 8 wherein said processor circuit further includes as said different operating states non-use and stored, and non-use and not stored; wherein said processor circuit further includes a plurality of different notification events of said handheld electronic device; and wherein the routine of said processor circuit is further adapted to determine a current one of said different operating states and to output one of said different states corresponding to a current one of said different notification events and the determined current one of said different operating states.

11. The handheld electronic device of claim 8 wherein the routine of said processor circuit is further adapted to output to said control circuit the third different intensity state when said sensed engagement includes said out-of-holster state and when said processor circuit determines that said handheld electronic device is in-use; and wherein said control circuit activates said vibrator at the third one of said different intensities corresponding to said third different intensity state.

12. The handheld electronic device of claim 11 wherein said routine is a first routine; wherein said processor circuit further includes a second routine; and wherein said first routine determines if said handheld electronic device is in-use based upon said second routine being activated.

13. The handheld electronic device of claim 11 wherein said input circuit includes microphone; and wherein said routine determines if said handheld electronic device is in-use based upon an input of a detected sound from said microphone to said processor circuit.

14. The handheld electronic device of claim 11 wherein said output circuit includes a speaker; and wherein said routine determines if said handheld electronic device is in-use based upon an output from said processor circuit to said speaker.

15. The handheld electronic device of claim 11 wherein said input circuit includes a plurality of keys; and wherein said routine determines if said handheld electronic device is in-use based upon detected activity from one of said keys.

16. The handheld electronic device of claim 15 wherein said routine determines if said handheld electronic device is not in-use based upon a predetermined period of time of no detected activity from said keys.

17. The handheld electronic device of claim 8 wherein said processor circuit further includes a wireless communication port.

18. A method for vibrating a handheld electronic device, said method comprising:

employing a plurality of different notification events of said handheld electronic device;

employing a plurality of different operating states of said handheld electronic device, said different operating states including an in-use state and a non-use state;

employing a plurality of different vibration intensity levels including a first intensity level corresponding to said in-use state and a second different intensity level corresponding to said non-use state; and configuring said handheld electronic device to selectively vibrate at a first one of said different vibration intensity levels as a function of a current one of said different notification events and said in-use state of said different operating states, and at a second one of said different vibration intensity levels as a function of the current one of said different notification events and said non-use state of said different operating states.

19. The method of claim 18 further comprising selecting one of said different vibration intensity levels from a user input device.

20. The method of claim 19 further comprising employing said user input device including a first position and a second position;

selecting the first one of said different vibration intensity levels responsive to the first position of said user input device; and selecting the different second one of said different vibration intensity levels responsive to the second position of said user input device.

21. The method of claim 18 further comprising employing a range of said different vibration intensity levels; and selecting one of said different vibration intensity levels from said range.

22. The method of claim 18 further comprising automatically determining the current one of said different operating states; and automatically vibrating said handheld electronic device at a corresponding one of said different vibration intensity levels based upon said current one of said different notification events and said determined current one of said different operating states.

23. The method of claim 22 further comprising selecting said different operating states of said handheld electronic device from the group comprising in-holster and non-use, out-of-holster and non-use, and out-of-holster and in-use;

employing said out-of-holster and in-use as said in-use state; and employing one of said in-holster and non-use and said out-of-holster and non-use as said non-use state.

24. The method of claim 18 further comprising employing as some of said different operating states a plurality of different operating modes of said handheld electronic device;

automatically determining a current one of said different operating modes; and automatically vibrating said handheld electronic device at a corresponding one of said different vibration intensity levels based upon said current one of said different notification events and said determined current one of said different operating modes.

25. The method of claim 24 further comprising selecting said different operating modes from the group comprising executing a first application routine, and executing a second different application routine.

26. The method of claim 24 further comprising selectively modifying at least one of said different vibration intensity levels.

27. The method of claim 18 further comprising initially vibrating said handheld electronic device at one of said different vibration intensity levels; and changing said one of said different vibration intensity levels.

28. The method of claim 27 further comprising continuously changing said one of said different vibration intensity levels over time.

29. The method of claim 27 further comprising vibrating said handheld electronic device with a plurality of discrete vibration pulses; and employing said discrete vibration pulses having different vibration intensities and constant vibration pulse lengths.

30. The method of claim 27 further comprising vibrating said handheld electronic device with a plurality of discrete vibration pulses; and employing said discrete vibration pulses having a plurality of different vibration pulse lengths.

31. The method of claim 27 further comprising mimicking a ring tone through vibration of said handheld electronic device.

32. The method of claim 27 further comprising disabling vibration of said handheld electronic device.

33. The method of claim 27 further comprising changing both time of vibration and intensity of vibration of said handheld electronic device over time.

34. The method of claim 27 further comprising increasing said one of said different vibration intensity levels.

35. The method of claim 34 further comprising manually deactivating vibration of said handheld electronic device.

36. The method of claim 35 further comprising un-holstering said handheld electronic device to deactivate said vibration.

37. The method of claim 18 further comprising wirelessly communicating from said handheld electronic device.

38. The method of claim 18 further comprising scrolling through a list including said different vibration intensity levels; and successively vibrating said handheld electronic device at at least some of said different vibration intensity levels.

39. The method of claim 18 further comprising selectively increasing or decreasing all of said different vibration intensity levels.

40. The method of claim 18 further comprising employing as one of said different notification events a navigation event associated with input and output circuits of said handheld electronic device; and configuring said handheld electronic device to selectively vibrate at a corresponding one of said different vibration intensity levels as a function of said navigation event and said in-use state.

41. The method of claim 18 further comprising employing a light intensity sensor to determine said non-use state.

* * * * *

UNITED STATES PATENT AND TRADEMARK OFFICE

CERTIFICATE OF CORRECTION

PATENT NO. : 7,019,622 B2
APPLICATION NO. : 10/855587
DATED : March 28, 2006
INVENTOR(S) : Kevin H. Orr et al.

It is certified that error appears in the above-identified patent and that said Letters Patent is hereby corrected as shown below:

Col. 6, line 47, "20" should read --20'- -

Signed and Sealed this

Eighteenth Day of July, 2006

JON W. DUDAS
*Director of the United States Patent and Trademark Office*